United States Patent
Aschaber et al.

(10) Patent No.: US 8,227,931 B2
(45) Date of Patent: Jul. 24, 2012

(54) GENERATING UNIT COMPRISING A COMBUSTION ENGINE AND A GENERATOR

(75) Inventors: Michael Aschaber, Aschach (AT); Markus Poxhofer, Mauer-Ohling (AT); Anton Leiminger, Aschbach (AT)

(73) Assignee: Steyr Motors GmbH, Steyr (AT)

( * ) Notice: Subject to any disclaimer, the term of this patent is extended or adjusted under 35 U.S.C. 154(b) by 376 days.

(21) Appl. No.: 12/595,315

(22) PCT Filed: Jun. 6, 2008

(86) PCT No.: PCT/AT2008/000198
§ 371 (c)(1),
(2), (4) Date: Oct. 9, 2009

(87) PCT Pub. No.: WO2008/148142
PCT Pub. Date: Dec. 11, 2008

(65) Prior Publication Data
US 2010/0127508 A1 May 27, 2010

(30) Foreign Application Priority Data

Jun. 6, 2007 (AT) .......................... GM 359/2007 U

(51) Int. Cl.
*H02K 7/18* (2006.01)
*F01D 15/10* (2006.01)
*F02C 6/00* (2006.01)
*H02P 9/04* (2006.01)

(52) U.S. Cl. ....................................................... 290/52
(58) Field of Classification Search .................. 290/45, 290/52, 46; 310/254, 258, 259, 261, 216, 310/113, 118, 168
See application file for complete search history.

(56) References Cited

U.S. PATENT DOCUMENTS

| 5,287,518 | A | * | 2/1994 | Miller et al. ..................... 322/90 |
| 5,679,087 | A | * | 10/1997 | Lutz ................................ 475/149 |
| 6,478,101 | B1 | * | 11/2002 | Taniguchi et al. ......... 180/65.22 |
| 6,617,747 | B1 | | 9/2003 | Petersen |
| 7,347,169 | B2 | * | 3/2008 | Nagahashi et al. ........ 123/41.35 |
| 7,560,838 | B2 | | 7/2009 | van der Woude |
| 8,084,908 | B2 | * | 12/2011 | Chiba ....................... 310/102 R |
| 2009/0302720 | A1 | * | 12/2009 | Chiba ........................ 310/75 R |

FOREIGN PATENT DOCUMENTS

| DE | 4404791 | 3/1995 |
| EP | 0984548 | 3/2000 |
| EP | 1775824 | 4/2007 |
| JP | 57000329 | 1/1982 |
| WO | 2006121045 | 11/2006 |

* cited by examiner

Primary Examiner — Javaid Nasri
(74) Attorney, Agent, or Firm — Bachman & LaPointe, P.C.

(57) ABSTRACT

A power generating unit consists of an internal combustion engine (1) and a generator (2), the former comprising a crankshaft (8) received in a crankcase (5) and the generator comprising a generator housing (20) connected to the crankcase (5), a stator (36) and a rotor (30) that is connected so as to rotate with the crankshaft (8). The aim is to provide a power generation unit that requires little space and that allows a precise guidance of a rotor designed for the overall unit power. A concentric stub shaft (11) is fixedly connected at the one end to the crankshaft (8) and at the other end to the rotor (30). The generator housing (20), on its side facing the internal combustion engine (1), has a front plate (21) that accommodates a bearing (23) for the sub shaft (11). The rotor (30) is otherwise overhung.

4 Claims, 1 Drawing Sheet

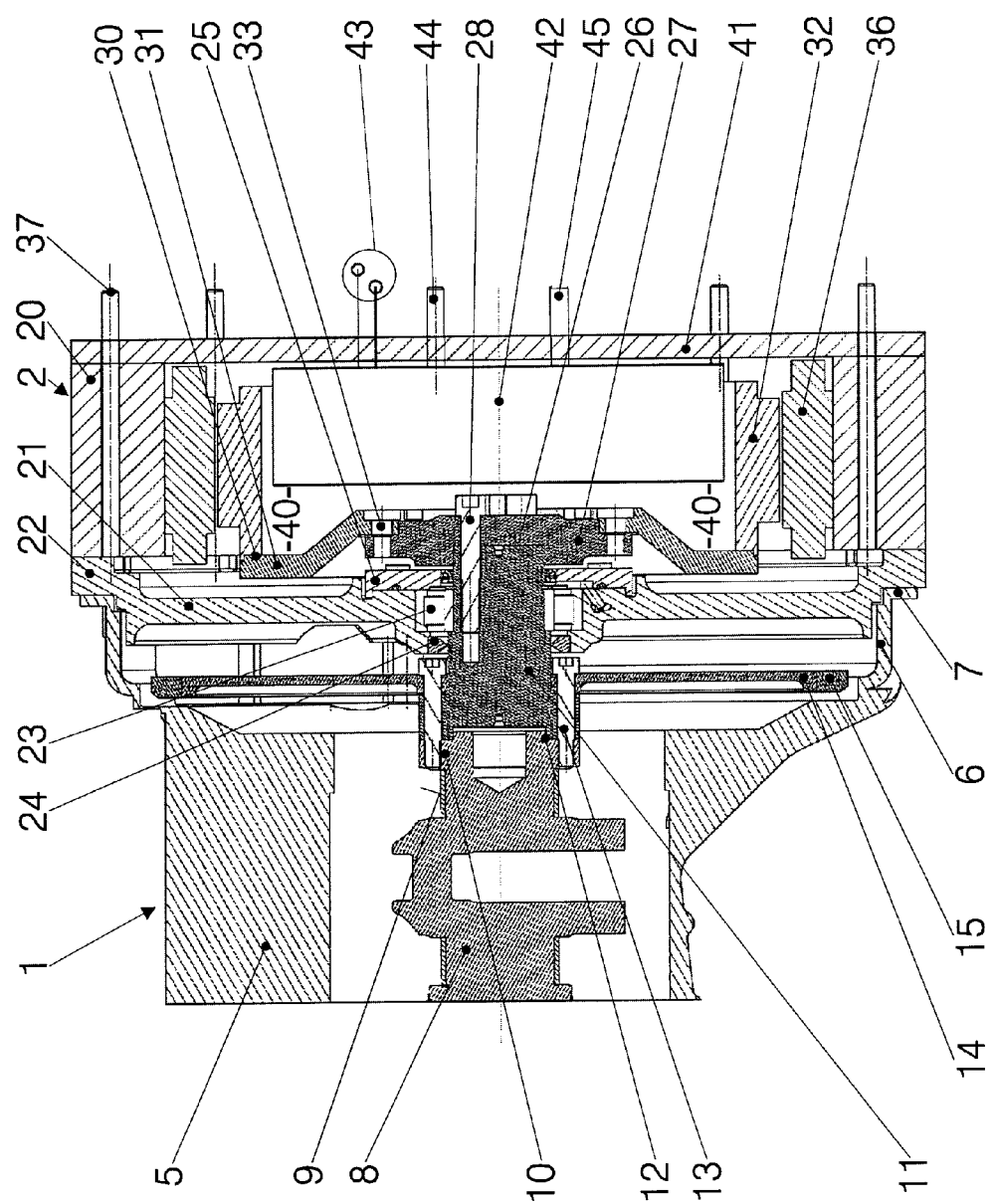

GENERATING UNIT COMPRISING A COMBUSTION ENGINE AND A GENERATOR

BACKGROUND OF THE INVENTION

The invention pertains to a generating unit comprising a combustion engine and a generator, the combustion engine having a crankshaft journalled in a crankcase and the generator comprising a generator casing joined to the crankcase, a stator and a rotor coupled to the crankshaft. The generator unit can be a stationary standby unit or a drive unit for a vehicle with electric motors, in particular wheel-mounted motors, supplied by the generator.

In such units, the whole power of the combustion engine is converted into electric power. Accordingly, the dimensions of the generator and the mass of its rotor are substantial. The first increases the weight and bulk of the whole unit, the second makes the unit prone to dynamic interaction between the rotor and the crankshaft. Such units usually employ combustion engines of high power and high specific power. Therefore and in order to allow for the small magnetic gap required for high efficiency of the generator additional support is required.

A generic generating unit is known from the Patent DE 44 04 791 C1. The generator of that unit comprises a cup-shaped rotor and stator windings located inside. The rotor has a central hub, which hub is not rigidly joined to the crank-shaft, but journalled in the generator casing on the far side of the combustion engine and centered with regard to the crankshaft by means of a pin. For the driving connection between the rotor and the crankshaft, a disk is provided, the disk being stiff in a circumferential direction and flexible for longitudinal and angular displacements. The capability of the disk to decouple vibrations is very limited, and further reduced by the centering pin. This pin, however, seems necessary because of the length of the tolerance chain from the crankshaft to the bearing on the far side of the crankshaft through both casings. The pin is a critical element because its strength and precision determine the width of the magnetic gap.

The publication WO 2006/121045 A1 discloses a unit, wherein only part of the engine power is branched of to the generator. Between the end of the crankshaft and an exit shaft, there is a stub shaft carrying the rotor of the generator. The rotational coupling is established by splines and the rotor is journalled in the generator casing on the far side from the combustion engine. This design is marred by the above mentioned tolerance—problem. Over and above it is not suitable for a unit without the journalled exit shaft.

It is the object of the invention to provide a generating unit that, with a minimum of bulk, allows a precise guidance of a rotor dimensioned for the entire power of the combustion engine and does not add any load to the crankshaft. On top of that, the generator must be easy to join to a combustion engine as is used for conventional mechanical drive trains.

SUMMARY OF THE INVENTION

According to the invention, this is achieved in that a concentric stub shaft is rigidly connected to the crankshaft with its one end and to the rotor with its other end, in that the generator casing has a front plate on the side near the combustion engine, the front plate comprising a bearing for the stub shaft, the stub shaft thereby being journalled between its two ends, and in that the rotor is overhung.

The stub shaft constitutes a stiff extension of the crankshaft and, further supported by the bearing in the front plate, it stiffens the crankshaft against flexural vibrations. The bearing in the front plate thus adds to the stiffness of the crankshaft. Because of the situation of the front plate on the engine side of the generator casing the tolerance chain and the duct for lubrication are short. Along with stiffening the crankshaft, the bearing is the sole bearing of the rotor, the rotor being rigidly connected to the crankshaft by means of the sub shaft. This creates a structure sufficiently stiff even for a rotor of considerable mass and it avoids the need for a second bearing on the side of the rotor remote from the combustion engine. This makes for a very short rotor that is easily assembled and accessible and from the side remote from the combustion engine.

In a preferred embodiment, the front plate has a centering flange for fitting the generator casing to the coupling bell of the engine casing. This results in very short lines of force and a very short tolerance chain. The bearing in the front plate preferably is a cylindrical roller bearing and its distance from the end of the stub shaft on the side of the rotor is smaller than its distance from the end on the side of the crankshaft. The roller bearing has a high load carrying capacity and allows for axial displacement of the stub shaft due to thermal expansion. Its larger distance from the crankshaft increases the stiffening effect of the stub shaft on the crankshaft and allows for a minimum of overhang (hangover ?) of the overhung rotor.

In a preferred embodiment, the rotor consists of a hollow cylinder and a centric disk, the disk being located on the side of the hollow cylinder adjacent the front plate, and the space within the hollow cylinder is open to the side afar from the front plate. Such a cup-shaped rotor has a particularly large magnetically active surface and its gravity center is near the bearing in the front plate. A further advantage is the free space inside the cup which is easily accessible from the side remote from the combustion engine.

In a development of the invention, advantage is taken of this (free space) by using it for housing electric/electronic components. These can even be the stator windings. If these are outside the rotor, the space can be used for receiving an electronic control and/or the power electronic unit. In this way, the latter is easily accessible and does not add to the bulk. The power electronic unit can be fitted to the inner side of a lid closing the generator casing on this far side. Because of the high electric power, a liquid cooling is advisable. A cooling fluid can be adducted to and returned from the lid via pipe sockets with a minimum of expenditure.

BRIEF DESCRIPTION OF THE DRAWINGS

FIG. 1 shows a longitudinal section through a unit according to the invention, only part of the combustion engine being visible.

DETAILED DESCRIPTION

The unit consists of a combustion engine, generally referenced as 1, and a generator 2. Of the first (1), part of the crankcase 5 and the crankshaft 5 are visible. The crankcase 5 widens into a coupling bell 6 ending in a gearbox flange to which a gearbox is fitted in conventional systems. The crankshaft is supported by a number of bearings and end in an end piece 10 outside the outermost bearing 9. In conventional units, a clutch would be fitted to the end piece 10.

In the disposition according to the invention, a stub shaft 11 is fitted to the end piece 10 for driving a generator 2. It has a centering offset 12 and its one end is rigidly connected to the crankshaft by means of screw bolts 13. In the embodiment shown, a disk 14 with a gear ring 14 for cooperating with the pignon of a starter is fixed by the same screw bolts.

The casing 20 of the generator 2 has, on its side facing the combustion engine, a front plate 21, the outer rim of which forms a centering flange 22 screwed to the coupling bell 6. The front plate 21 has at its inner rim an antifriction bearing 23 with cylindrical rollers for journalling the stub shaft 11. On its side of the engine, there is a sealing ring, on the side of the generator, there is a bearing lid with a sealing ring. This roller bearing 23 constitutes, together with the outermost bearing 9 of the crankshaft, the support of the rotor 30, wherefore it is located at the widest possible distance from the bearing 9. Over and above, the roller bearing 23 stiffens the crankshaft 8.

At its other end, the far end from the crankshaft, the stub shaft 11 has a centering face 26, to which a centering flange 27 is rigidly secured by means of screw bolts 28. The rotor 30 of the generator here consists of a concave disk 31 and a hollow cylinder 32. The inner rim of the disk 31 is secured to the centering flange 27 by means of screw bolts 33. The hollow cylinder is, for example, mounted with permanent magnets (not shown). The rotor is an overhung cup-shaped rotor.

If, as shown, the stator windings 36 are mounted in the generator housing 20 on the outer side of the rotor, a free space remains inside the rotor 30, this free space being enclosed between the concave disk 21 on one side and the rear wall 41 of the generator casing 20. This free space is wide enough to accommodate the power electronics 42. In this way it is easily accessible and housed without adding to the bulk. The electric lines between it (42) and the stator windings 36 are not shown; only the plugs sockets 43 for supplying the electric current to the users are indicated. Further, pipe sockets 44,45 for adduction and return of a liquid cooling medium are shown. This allows a higher density of power and therewith a reduced bulk of the generator. This makes the design according to the invention suitable for units of high power for driving even very big and heavy vehicles.

The invention claimed is:

1. A power generating unit comprising an internal combustion engine and a generator, the internal combustion engine having a crankshaft journalled in a bearing in a crankcase, the generator comprising a generator casing joined to the crankcase, a stator and an overhung rotor coupled to the crankshaft, a concentric stub shaft having one end rigidly connected to the crankshaft and another end connected to the rotor, wherein the generator casing has a front plate on a side near the internal combustion engine which houses a further bearing for journalling the stub shaft, wherein the stub shaft is journalled between its ends.

2. A power generating unit according to claim 1, wherein the front plate on the side of the rotor near the internal combustion engine has a centering flange for joining a generator housing to a coupling bell of the crankcase.

3. A power generating unit according to claim 1, wherein the bearing for the stub shaft is a roller bearing, whose distance from the other end of the stub shaft on the side of the rotor is smaller than the distance from the one end on the side of the crankshaft.

4. A power generating unit according to claim 1, wherein the rotor is cup-shaped comprising a hollow cylinder and a centric disk, the disk is located on a side of the hollow cylinder near the front plate on the side of the rotor near the internal combustion engine, and a space inside the hollow cylinder is open to a side remote from the front plate.

\* \* \* \* \*